United States Patent
Zhu et al.

(10) Patent No.: US 8,380,482 B2
(45) Date of Patent: Feb. 19, 2013

(54) SYSTEM AND METHOD FOR CLOCK MODELING IN DISCRETE-EVENT SIMULATION

(75) Inventors: Hua Zhu, San Diego, CA (US);
Liangping Ma, San Diego, CA (US);
Bong K. Ryu, Poway, CA (US)

(73) Assignee: The Boeing Company, Chicago, IL (US)

( * ) Notice: Subject to any disclaimer, the term of this patent is extended or adjusted under 35 U.S.C. 154(b) by 684 days.

(21) Appl. No.: 12/213,118

(22) Filed: Jun. 13, 2008

(65) Prior Publication Data

US 2009/0119086 A1    May 7, 2009

Related U.S. Application Data

(60) Provisional application No. 60/929,121, filed on Jun. 13, 2007.

(51) Int. Cl.
*G06G 7/62* (2006.01)
*G06F 17/50* (2006.01)
(52) U.S. Cl. .................. 703/17; 703/16; 703/19
(58) Field of Classification Search .............. 703/13–17, 703/19
See application file for complete search history.

(56) References Cited

U.S. PATENT DOCUMENTS

| | | | | | |
|---|---|---|---|---|---|
| 5,801,938 | A | * | 9/1998 | Kalantery | 700/2 |
| 6,134,514 | A | * | 10/2000 | Liu et al. | 703/17 |
| 7,564,809 | B1 | * | 7/2009 | Manohar et al. | 370/310 |
| 2006/0004862 | A1 | * | 1/2006 | Fisher et al. | 707/104.1 |

OTHER PUBLICATIONS

Saarnisaari, H.; , "Analysis of a discrete network synchronization algorithm," Military Communications Conference, 2005. MILCOM 2005. IEEE , vol., No., pp. 740-746 vol. 2, Oct. 17-20, 2005.*
Allan, D.W., Time and Frequency (Time-Domain) Characterization, Estimation, and Prediction of Precision Clocks and Oscillators, in IEEE Transactions on Ultrasonics, Ferroelectrics and Frequency Control, vol. 34, Issue 6, 1987, pp. 647-654.

* cited by examiner

*Primary Examiner* — Mary C Jacob
*Assistant Examiner* — Aniss Chad
(74) *Attorney, Agent, or Firm* — Armstrong Teasdale LLP

(57) ABSTRACT

Local clock modeling for a discrete event simulator is described. A local clock generator provides realistic clock characteristics in terms of clock precision and clock drift and clock mapping utilities provide API for other modules and/or protocols in the discrete event simulator to schedule events on local clocks instead of global clock of the simulator.

16 Claims, 4 Drawing Sheets

$$x(t) = x_0 + y_0 t + 1/2 Dt^2 + \xi(t)$$

- Local time → $x(t)$
- Logical time → $x_0$... (arrow to equation)
- Time offset → $x_0$
- Frequency offset → $y_0 t$
- Frequency drift → $1/2 Dt^2$
- Random deviation → $\xi(t)$

SYSTEM AND METHOD FOR CLOCK MODELING IN DISCRETE-EVENT SIMULATION

The present application claims the priority of U.S. Provisional Application No. 60/929,121 filed Jun. 13, 2007.

The present application is generally directed to a system and method for simulating discrete events. More specifically the application is directed to a clock modeling for discrete event simulation.

Discrete-event simulation is a very powerful technology for scientific communities as well as industry settings in which the operation of network elements can be simulated. It is capable of simulating extremely complicated systems and networks in high fidelity, yet without significant cost for actual hardware and field deployment.

It can be used for testing and validation of algorithmic and protocol design, and for planning and performance analysis. It can be used to analyze not only the behavior of any individual component, but also to analyze the aggregated impact of a collection of components, which is usually otherwise hard to get via an analytical approach. Known discrete-event simulators include: NS-2, QualNet, OPNET, OMNeT, NCTUns, etc.

In the typical discrete-event simulators, real world systems are modeled and decomposed into a set of logically separate processes (LPs) autonomously progressing through time. Each event must take place on a specific process, and must be assigned a simulation logical time (a timestamp). The result of this event on a specific process can be a message passed to one or more other processes (including, if required, the process on which the event occurred). On arrival at this other process, the content of the message may result in the generation of new events, to be processed at some specified future logical time. The principal restriction placed on discrete event simulation is that an event cannot affect the outcome of a prior event, that is, logical time cannot run backwards. This restriction is imposed to accurately model the causality in the real world. However, due to inaccuracy in clocking sources, a simulated event may have a local time which is earlier than another event, solely due to the inaccuracies of the respective local clock generators.

Due to the aforementioned causality reason, in prior art discrete-event simulators, the logical time has been used as the equivalent of the actual local time of all individual systems or sub-systems. This is unfortunately not true in the real world. First, the quality of clock sources of different hardware platforms may vary. For example, the local clock of a low-cost power-efficient sensor platform is usually of coarse quality compared to the clock of a more expensive platform without power constraints. Second, even for the same type of hardware platform, the clock source of two individual systems will not be exactly the same due to Brownian motion. These factors may lead to clock drift and clock offset between any pair of systems with independent local clock sources. As a result, the prior art discrete-event simulators are not capable of simulation tasks that require accurate clock modeling, such as in clock synchronization algorithms and protocol design in sensor networks. For such accuracy intensive tasks, real hardware platform experiment is still the only viable high-fidelity approach. Nevertheless, it is highly desirable in terms of saving resources and time to be able to model local clocks in discrete-event simulation while not compromising the causality of events.

SUMMARY

The present disclosure is directed to an innovative solution for clock modeling in discrete-event simulation.

BRIEF DESCRIPTION OF THE DRAWINGS

FIG. 2 illustrates a local clock generator for use with one embodiment of clock modeling according to the present disclosure.

DETAILED DESCRIPTION

Figure 1:
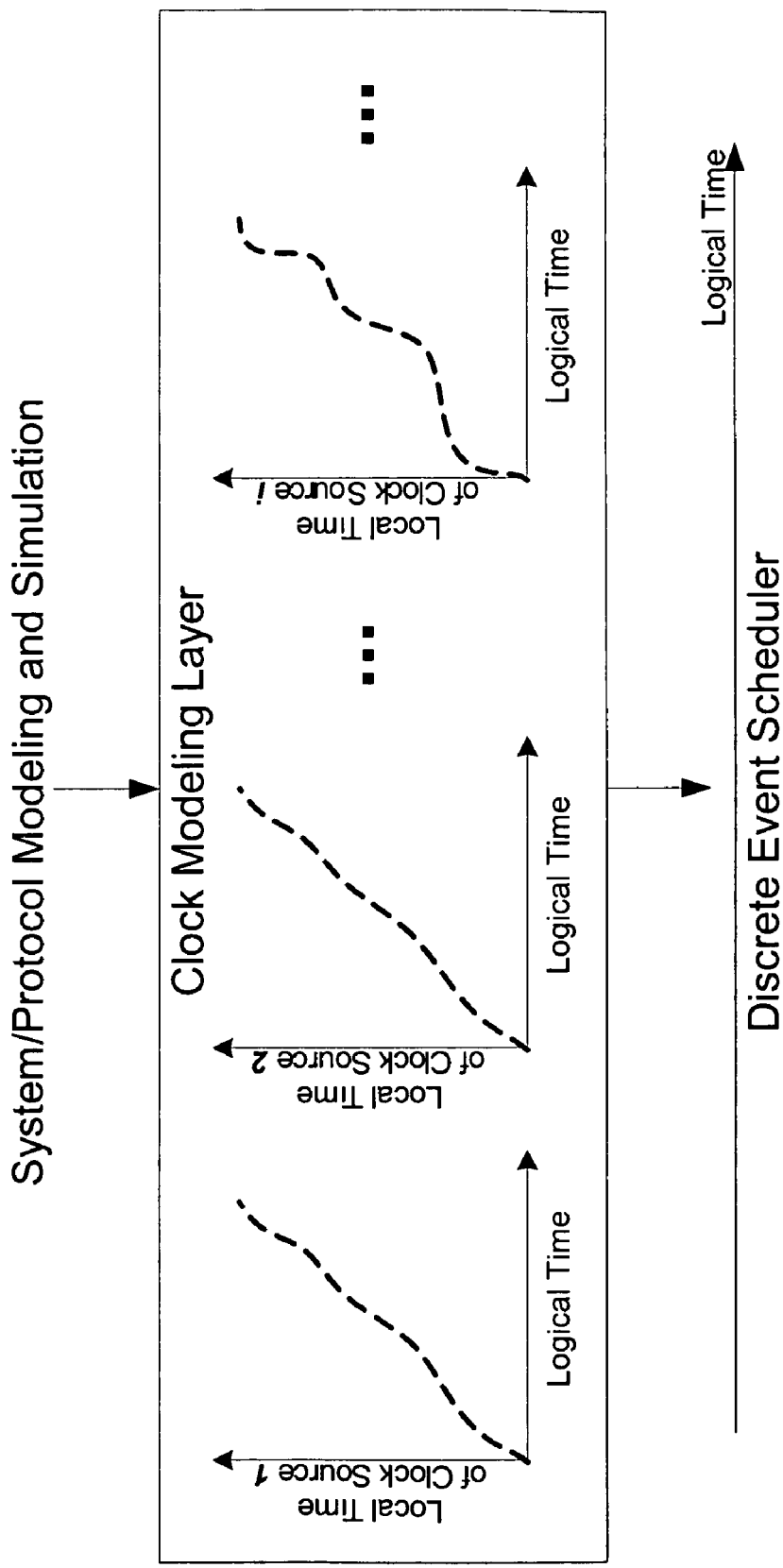
FIG. 1 is a simplified pictorial representation of one embodiment of a discrete event simulator with a clock modeling layer.

FIG. 1 shows a simplified pictorial representation of a discrete event simulator 100 with clock modeling layer 110. The clock modeling layer 110 is located between the discrete event scheduler 100 and all other modules 120.

The clock modeling layer 110 acts as a local clock generator. For each independent clock source, the clock modeling layer 110 may generate a one-to-one relationship between local time and the logical time of the simulator to create the paired sampling values of local time and logical time. The local clock generator can adopt various analytical models and/or empirical data for different independent clock sources.

Simulating the operation of network elements is complicated because of the processes that each element runs may affect the operation of another element. The discrete element simulator disclosed herein is beneficial for simulating the operation of various network elements, including without limitation, the operation of wireless transceivers, the operation of communication nodes, the operation of computer nodes, the operation of industrial machinery, and the operation of a network of sensors.

FIG. 2 gives an example of local clock generator 200 based on a statistical model described in "Allan, D. W., Time and Frequency (Time-Domain) Characterization, Estimation, and Prediction of Precision Clocks and Oscillators, in IEEE Transactions on Ultrasonics, Ferroelectrics and Frequency Control, Vol. 34, Issue 6, 1987, pp. 647-654":

$$x(t) = x_0 + y_0 t + \tfrac{1}{2} D t^2 + \xi(t)$$

where:
  $x(t)$ is local time
  $x_0$ is time offset in seconds
  $y_0 t$ is frequency offset in part per million (ppm)
  $\tfrac{1}{2} D t^2$ is frequency drift in ppm/year
  $\xi(t)$ is random deviation in $10^{-8} *$sec The clock modeling layer 110 may be implemented in known discrete event simulators. For example, it may be implemented in a prior art simulator named QualNet. The clock generator illustrated in FIG. 2 has been used by the inventors of the present application and the simulation results were validated with results from hardware experiments. For example, by setting $\{x_0, y_0, D, \xi\}$ to different values, different clock characteristics can be simulated without actual hardware platforms. If $\{x_0, y_0, D, \xi\} = \{0, 0, 0, 0\}$, the local clock source becomes a perfect one, matching the logical clock of the simulator. If $\{x_0, y_0, D, \xi\}=\{0, 0.02, 0, 0.02\}$, the local clock source resembles the characteristics of Mica2/MicaZ sensor platforms.

The clock generator illustrated in FIG. 2 is just one example of a clock generator for use with the present disclosure. It is appreciated that the local clock generator can leverage either similar statistical models or experiment clock samples directly. Likewise, the QualNet simulator is but one illustrative example, and many other discrete event simulators are suitable for use with the present disclosure.

Figure 3:
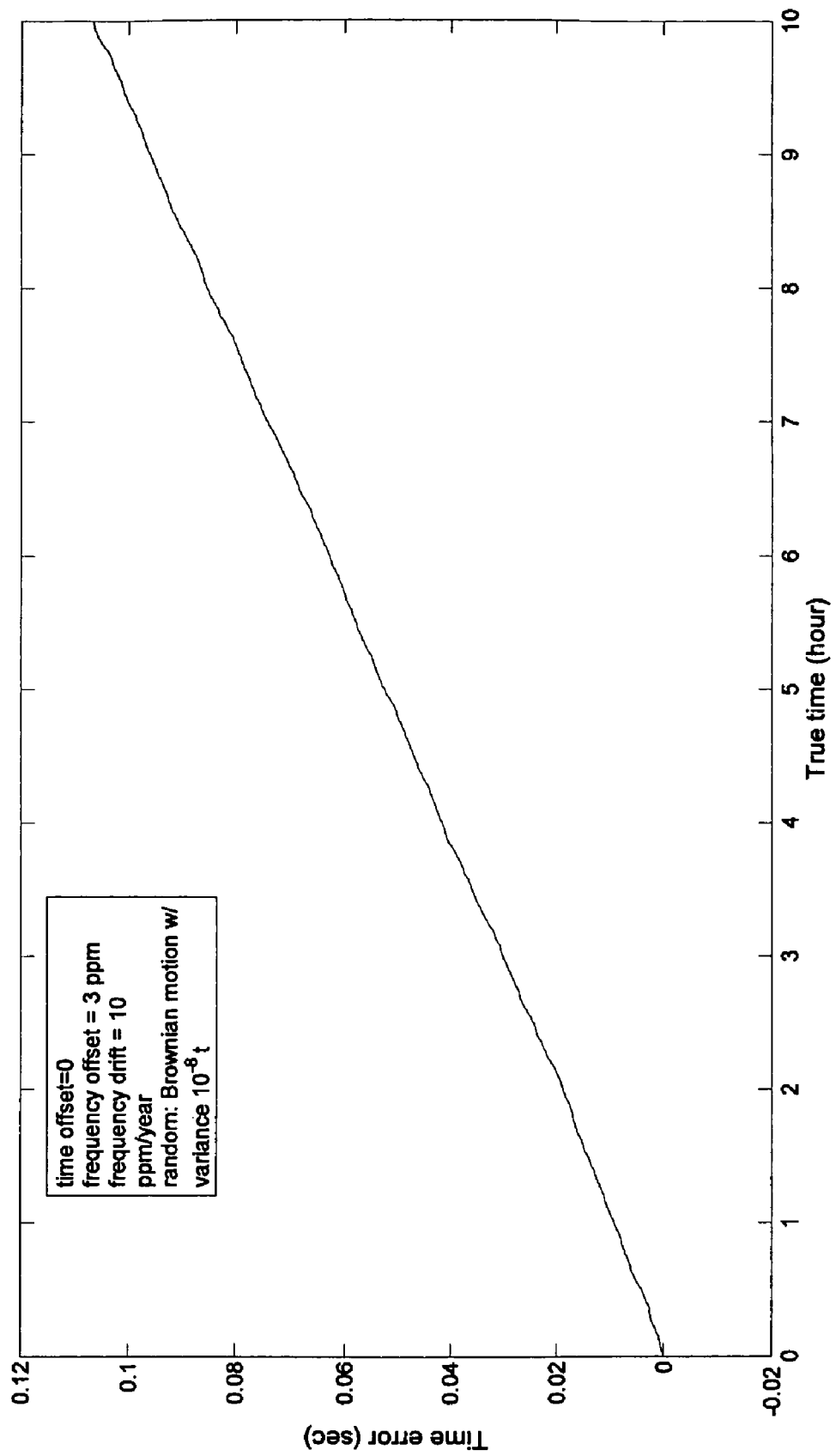
FIG. 3 illustrates one example of the clock skew between logical time and local time of an independent clock sources for the local clock generator of FIG. 2.

FIG. 3 shows the clock skew between the logical time and the local time using the local clock generator from FIG. 2. A set of related parameters is also illustrated in FIG. 3 which drives the clock skew, i.e., $\{x_0, y_0, D, \xi\}=\{0, 3.0, 10, 1\}$. The generated clock relationship data can be all kept in runtime memory or dumped into clock characterization data files and accessed on demand during the simulation. The sampling resolution can also be adjusted according to the computational and precision requirements.

The clock modeling layer 110 may also provide a set of clock mapping utilities for all the other modules in the simulator. By using these utilities, other modules can (i) convert local time to logical time; (ii) convert logical time to local time, (iii) convert local duration to logical duration; (iv) convert logical duration to local duration. FIG. 4 illustrates clock mapping utilities which may be used with the present disclosure.

Figure 4A:
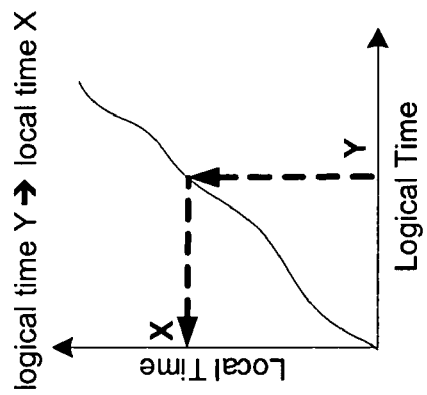
FIG. 4 illustrates a simplified graphical representation of four types of clock mapping utilities in accordance with the present disclosure.

With reference to FIG. 4A, a real world system often needs to schedule certain events (e.g., transmission, switching power on/off) at specific time according to its own local clocks. To coordinate such events among independent systems in a discrete event simulator, all the events have to be mapped onto a common logical time axis. For example, the local clock on System A is 1 second behind the local clock on System B. System A and B schedule two events ($E_A$ and $E_B$) at $t_0$ and $t_0+0.5$ sec based on their own local clocks, respectively. By converting local time X to the common logical time Y, $E_A$ may actually take place after $E_B$. Without such time conversion, the real world causality cannot be maintained, which compromises the validity of simulation.

Figure 4B:
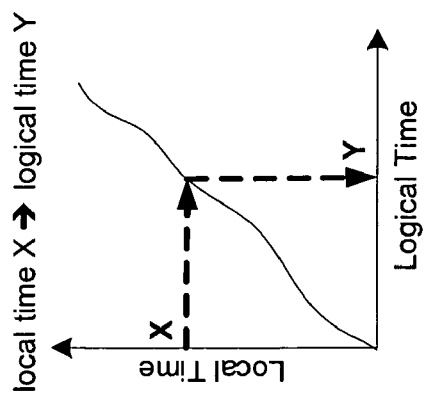

With reference to FIG. 4B in the discrete event simulation, events can be scheduled on the common logical time reference. When a scheduled event occurs to a specific system, it needs to obtain the local time when the event occurs for various purposes, including data logging, decision making, etc. In the example of sensor networks, sensors may be stimulated by an environmental event and have to log the timestamp according to their own clocks, which requires conversion from simulation logical time Y to local time X.

Figure 4C:
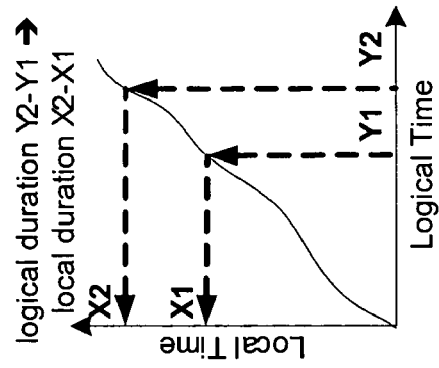

With reference to FIG. 4C, a real world system often needs to schedule timer events (e.g., 802.11 MAC backoff timer, TCP retransmission timer), which are specified by duration (in local clock time reference) from current local clock time. In order to maintain correct causality of the discrete event simulator, such timer events have to be mapped on the common logical clock axis in the simulation. The simulator will generate corresponding timer events for local clock duration $\Delta X$ according to the common logical time reference $\Delta Y$ given such conversion.

Figure 4D:
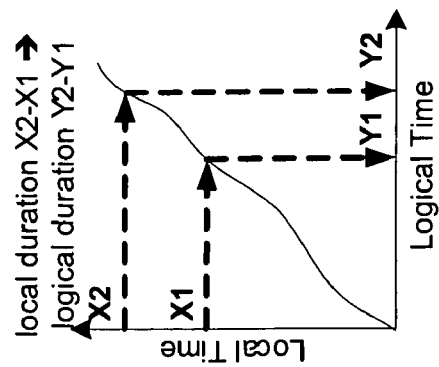

With reference to FIG. 4D, in order to correctly simulate interactions among systems in a network environment, time duration on the common logical clock axis $\Delta Y$, possibly generated for aforementioned timer events, may have to be converted into local duration $\Delta X$ with respect to a different local clock reference at another system.

So far, all the existing discrete event simulators, including popular ones such as NS-2, QualNet, OPNET, etc., do not support the aforementioned local clock modeling and utilities. These simulators have an implicit assumption that all the independent systems in real world magically share the same common logical clock reference, which can be far from the reality. The clock variation among independent systems is prevalent in the real world. And the magnitude of such variation can be at a non-negligible level in many practical scenarios, such as low-cost hardware platforms and high clock precision requirement for broadband communications, as well as emerging sensing applications (e.g., ballistic wave measurement). Only by leveraging our innovative technology described in this document, can high-fidelity simulations be achieved for the above scenarios in existing or any future discrete event simulator.

Thus, the present disclosure solves the causality problem that had hampered realistic clock modeling in discrete event simulation. Furthermore, the proposed solution is generic and therefore can be directly applied to various simulators heavily used in the scientific communities and industry settings. With this newly introduced clock modeling capability in discrete event simulation, significant monetary and time savings are made possible in research and development of a broad scope of systems and networking technologies.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed:

1. A method of discrete element simulation comprising the steps of:
   (a) separating an operation of network elements to be simulated into a plurality of logically separate processes, wherein a first process of the plurality of logically separate processes is a simulation of an event performed by a first network element and wherein a second process of the plurality of logically separate processes is a simulation of an event performed by a second network element, wherein the first network element includes a first local clock that generates a first local time and the second network element includes a second local clock that generates a second local time;
   (b) selecting at least one clock characteristic for the first local clock that relates a local time generated by the first local clock to a logical time associated with a logical time reference;
   (c) selecting at least one clock characteristic for the second local clock that relates a local time generated by the second local clock to a logical time associated with the logical time reference;
   (d) scheduling the first process for execution at a first local time;
   (e) scheduling the second process for execution at a second local time;
   (f) converting the first local time to a first logical time associated with the logical time reference;
   (g) converting the second local time to a second logical time associated with the logical time reference; and
   (h) simulating the operation of the network elements by executing the first process at the first logical time and the second process at the second logical time.

2. The method of claim 1 wherein selecting at least one clock characteristic for the first local clock and at least one clock characteristic for the second local clock comprises modeling actual operation of the first local clock and the second local clock according to the equation:

$$x(t)=x_0+y_0t+\tfrac{1}{2}Dt^2+\xi(t)$$

where:
x(t) is local time
$x_0$ is time offset in seconds
$y_0 t$ is frequency offset in part per million (ppm)
$\tfrac{1}{2} Dt^2$ is frequency drift in ppm/year
$\xi(t)$ is random deviation in $10^{-8}$*sec.

3. The method of claim 2 wherein the parameters $x_0$, $y_0$, D and $\xi$ are the same for the first and second local clocks.

4. The method of claim 1 wherein the operation of network elements is at least one of, the operation of wireless transceivers, the operation of communication nodes, the operation of computer nodes, the operation of industrial machinery, and the operation of a network of sensors.

5. The method of claim 1 wherein the logical time reference is based on the first or second local clock.

6. The method of claim 1 wherein the logical time reference is based on at least one of a recognized universal time standard and a logical time generated by a discrete element simulator.

7. The method of claim 6 wherein the recognized universal time standard is a global positioning system (GPS) based reference.

8. A method of discrete event simulation comprising the steps of:
   (a) separating an operation of network elements to be simulated into a plurality of logically separate processes, wherein a first process of the plurality of logically separate processes is a simulation of an event performed by a first network element and wherein a second process of the plurality of logically separate processes is a simulation of an event performed by a second network element, wherein the first network element includes a first local clock that generates a first local time and the second network element includes a second local clock that generates a second local time;
   (b) scheduling a first logically separate process to be executed at a first logical time with respect to a common logical time reference;
   (c) scheduling a second logically separate process to be executed at a second logical time with respect to the common logical time reference;
   (d) executing the first logically separate process at the first logical time;
   (e) executing the second logically separate process at the second logical time;
   (f) selecting at least one clock characteristic for the first local clock that relates a local time generated by the first local clock to the common logical time reference;
   (g) selecting at least one clock characteristic for the second local clock that relates a local time generated by the second local clock to the common logical time reference;
   (h) identifying the first local time, wherein the first local time is the local time output by the first local clock at the time of execution of the first process; and
   (i) identifying the second local time, wherein the second local time is the local time output by the second local clock at the time of execution of the second process.

9. The method of claim 8 further comprising the step of mapping the identified execution times of the first and second logically separate processes to the logical time reference.

10. The method of claim 9 wherein the mapped execution times are used to schedule the first logically separate process using the first local clock.

11. The method of claim 9 wherein the mapped execution times are used to schedule the first logically separate process using the second local clock.

12. The method of claim 8 wherein selecting at least one clock characteristic for the first local clock and at least one clock characteristic for the second local clock comprises modeling the first local clock and the second local clock according to the equation:

$$x(t)=x_0+y_0t+\tfrac{1}{2}Dt^2+\xi(t)$$

where:
x(t) is local time
$x_0$ is time offset in seconds
$y_0 t$ is frequency offset in part per million (ppm)
$\tfrac{1}{2} Dt^2$ is frequency drift in ppm/year
$\xi(t)$ is random deviation in $10^{-8}$*sec.

13. The method of claim 12, wherein the parameters $x_0$, $y_0$, D and $\xi$ are the same for the first and second local clocks.

14. The method of claim 8 wherein the operation of network elements is at least one of, the operation of wireless transceivers, the operation of communication nodes, the operation of computer nodes, the operation of industrial machinery, and the operation of a network of sensors.

15. The method of claim 8 wherein the logical time reference is based on a recognized universal time standard.

16. The method of claim 8 further comprising logging the first local time as the local time output by the first local clock when the first network element performed the first event.

* * * * *